United States Patent
Isabell

(10) Patent No.: US 8,593,256 B2
(45) Date of Patent: Nov. 26, 2013

(54) WASHABLE RFID DEVICE FOR APPAREL TRACKING

(75) Inventor: Michael J. Isabell, Grand Rapids, MI (US)

(73) Assignee: Avery Dennison Corporation, Mentor, OH (US)

( * ) Notice: Subject to any disclaimer, the term of this patent is extended or adjusted under 35 U.S.C. 154(b) by 638 days.

(21) Appl. No.: 12/489,521

(22) Filed: Jun. 23, 2009

(65) Prior Publication Data

US 2010/0321161 A1    Dec. 23, 2010

(51) Int. Cl.
| | |
|---|---|
| *H04Q 5/22* | (2006.01) |
| *G08B 13/14* | (2006.01) |
| *A44B 1/28* | (2006.01) |
| *A44B 11/25* | (2006.01) |
| *A44B 17/00* | (2006.01) |

(52) U.S. Cl.
USPC .................. 340/10.1; 340/572.9; 24/104

(58) Field of Classification Search
USPC ........... 340/572.7, 10.1, 572.9, 568.1; 24/104
See application file for complete search history.

(56) References Cited

U.S. PATENT DOCUMENTS

| | | | |
|---|---|---|---|
| 4,754,285 A | | 6/1988 | Robitaille |
| 5,603,143 A | * | 2/1997 | Rucker ........................... 24/90.1 |
| 5,654,693 A | * | 8/1997 | Cocita ........................ 340/572.1 |
| 5,906,004 A | | 5/1999 | Lebby et al. |
| 6,080,690 A | | 6/2000 | Lebby et al. |
| 6,100,804 A | * | 8/2000 | Brady et al. ............... 340/572.7 |
| 6,154,138 A | | 11/2000 | Nilsson |
| 6,259,369 B1 | * | 7/2001 | Monico ...................... 340/572.8 |
| 6,285,342 B1 | * | 9/2001 | Brady et al. ................... 343/895 |
| 6,677,917 B2 | | 1/2004 | Van Heerden et al. |
| 6,727,197 B1 | | 4/2004 | Wilson et al. |
| 6,795,975 B2 | | 9/2004 | Marmaropoulos et al. |
| 6,827,817 B2 | | 12/2004 | Bleckmann et al. |
| 6,867,740 B2 | * | 3/2005 | Goodyear ..................... 343/718 |
| 7,034,685 B2 | | 4/2006 | Fabre et al. |
| 7,256,699 B2 | * | 8/2007 | Tethrake et al. ........... 340/572.8 |
| 7,308,294 B2 | | 12/2007 | Hassonjee et al. |
| 7,465,695 B2 | | 12/2008 | Tischer et al. |
| 7,474,910 B2 | | 1/2009 | Hassonjee et al. |
| 7,486,252 B2 | | 2/2009 | Hiltmann et al. |
| 7,605,708 B2 | * | 10/2009 | Cote et al. .................. 340/572.8 |
| 2006/0044769 A1 | * | 3/2006 | Forster et al. .................. 361/760 |
| 2006/0156518 A1 | * | 7/2006 | Frank .............................. 24/104 |
| 2008/0074272 A1 | * | 3/2008 | Stobbe et al. .............. 340/572.7 |
| 2010/0032487 A1 | * | 2/2010 | Bohn et al. ..................... 235/492 |

FOREIGN PATENT DOCUMENTS

| | | |
|---|---|---|
| DE | 10-2004-032569 | 1/2005 |
| EP | 0 288 676 | 11/1988 |
| JP | 03-155088 | 7/1991 |
| WO | 01/36728 | 5/2001 |
| WO | 2005/071605 | 8/2005 |

* cited by examiner

*Primary Examiner* — Daniel Wu
*Assistant Examiner* — Mohamed Barakat
(74) *Attorney, Agent, or Firm* — Avery Dennison Corporation

(57) ABSTRACT

A radio frequency identification (RFID) device including: a circuit provisioned to communicate an identification code to an RFID reader; a first antenna operatively connected to the circuit; and a radiating structure inductive coupled to the first antenna.

11 Claims, 2 Drawing Sheets

WASHABLE RFID DEVICE FOR APPAREL TRACKING

BACKGROUND

The present inventive subject matter relates generally to the art of radio frequency (RF) communications. Particular relevance is found in connection with washable or otherwise durable RFID (RF IDentification) devices that are particularly advantageous, for example, to track clothing or apparel, and accordingly the present specification makes specific reference thereto. However, it is to be appreciated that aspects of the present inventive subject matter are also equally amenable to other like applications.

RFID devices are generally known in the art. Conventionally, RFID tags, labels and/or transponders (collectively referred to herein as "devices") are widely used to associate a tagged or labeled object with an identification code or other information provided by the RFID device. In conventional parlance, an RFID label generally refers to an RFID device that is adhesively or similarly attached directly to an object, and an RFID tag, in contrast, generally refers to an RFID device that is secured to objects by other means (e.g., by a mechanical fastener such as screw, rivet, etc. or by another suitable fastener or fastening means). In any event, RFID devices are conventionally used, e.g., to track inventory, parcels and/or other objects.

A typical RFID device generally includes a number of components including an antenna for wirelessly transmitting and/or receiving RF signals and analog and/or digital electronics operatively connected thereto. So called active or semi-passive RFID devices may also include a battery or other suitable power source. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RFID devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as the aforementioned identification code) communicated from an RFID device. The manner in which the RFID reader interacts and/or communicates with the RFID device generally depends on the type of RFID device. A given RFID device is typically categorized as a passive device, an active device, a semi-passive device (also known as a battery-assisted or semi-active device) or a beacon type RFID device (which can be thought of as a sub-category of active devices). Passive RFID devices generally use no internal power source, and as such, they are passive devices which are only active when an RFID reader is nearby to power the RFID device, e.g., via wireless illumination of the RFID device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter is used in far-field applications (i.e., where the distance between the RFID device and reader is greater than approximately a few wavelengths), and alternately, load modulation is used in near-field applications (i.e., where the distance between the RFID device and reader is within approximately a few wavelengths).

Passive RFID devices typically signal or communicate their respective data or information by backscattering a carrier wave from an RFID reader. That is to say, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device.

As mentioned earlier, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides just enough power for the IC or microchip in the RFID device to power up and transmit a response. This means that the antenna generally has to be designed both to collect power from the incoming signal and also to transmit the outbound backscatter signal.

Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Broadly speaking, there are two kinds of active RFID devices—one can be generally thought of as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RFID devices, due to their on-board power supply, may transmit at higher power levels (e.g., as compared to passive devices), allowing them to be more robust in various operating environments. However, the battery or other on-board power supply can tend to cause active RFID devices to be relatively larger and/or more expensive to manufacture (e.g., as compared to passive devices). Additionally, as compared to passive RFID devices, active RFID devices have a potentially more limited shelf life—i.e., due to the limited lifespan of the battery. Nevertheless, the self supported power supply commonly permits active RFID devices to include generally larger memories as compared to passive devices, and in some instances the on-board power source also allows the active device to include additional functionality, e.g., such as obtaining and/or storing environmental data from a suitable sensor.

Semi-passive RFID devices are similar to active devices in that they are typically provisioned with their own power source, but the battery commonly only powers the IC or microchip and does not provide power for signal broadcasting. Rather, like passive RFID devices, the response from the semi-passive RFID device is usually powered by means of backscattering the RF energy received from the RFID reader, i.e., the energy is reflected back to the reader as with passive devices. In a semi-passive RFID device, the battery also commonly serves as a power source for data storage.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). Typically, passive LF RFID devices (also referred to as LFID or LowFID devices) can usually be read from within approximately 12 inches (0.33 meters); passive HF RFID devices (also referred to as HFID or High-FID devices) can usually be read from up to approximately 3 feet (1 meter); and passive UHF RFID devices (also referred to as UHFID devices) can be typically read from approximately 10 feet (3.05 meters) or more. One important factor influencing the read range for passive RFID devices is the method used to transmit data from the device to the reader, i.e., the coupling mode between the device and the reader—which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

In inductive coupling applications (e.g., as are conventionally used by passive LFID and HFID devices), the device and reader are typically each provisioned with a coil antenna that together form an electromagnetic field therebetween. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field therebetween in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it's out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively cheaper than wire winding, e.g., lithography or the like. UHFID passive devices are usually radiatively and/or propagationally coupled with the reader antenna and consequently can often employ conventional dipole-like antennas.

Using an RFID device to track and/or inventory apparel is not unknown. However, there are problems with many conventional solutions. For example, the RFID device can be eventually destroyed or its performance severely degraded by repeated washings of the tagged clothing or other apparel item, particularly in applications where a machine laundry process is being used. For example, entertainment facilities, amusement parks, and/or other enterprises employing a plurality of costumes or uniforms or other apparel, may desire to track and/or inventory that apparel by providing selected apparel items with respective RFID devices. However, subjecting the apparel items, along with the RFID devices affixed thereto, to repeated washing and/or other laundry processes can tend to damage the RFID devices. That is to say, the heat, stress, humidity, chemical cleaners and/or other environmental conditions associated with conventional laundry processes may tend to damage (i.e., destroy or degrade the performance of) an RFID device exposed thereto.

Accordingly, a new and/or improved RFID device is disclosed which addresses the above-referenced problem(s) and/or others.

SUMMARY

In accordance with one embodiment, an RFID device is disclosed that is suitable for tracking and/or inventorying apparel items.

In accordance with another embodiment, an apparel item provisioned with the aforementioned RFID device is disclosed.

Numerous advantages and benefits of the inventive subject matter disclosed herein will become apparent to those of ordinary skill in the art upon reading and understanding the present specification.

BRIEF DESCRIPTION OF THE DRAWING(S)

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

DETAILED DESCRIPTION OF THE EMBODIMENT(S)

Figure 1:
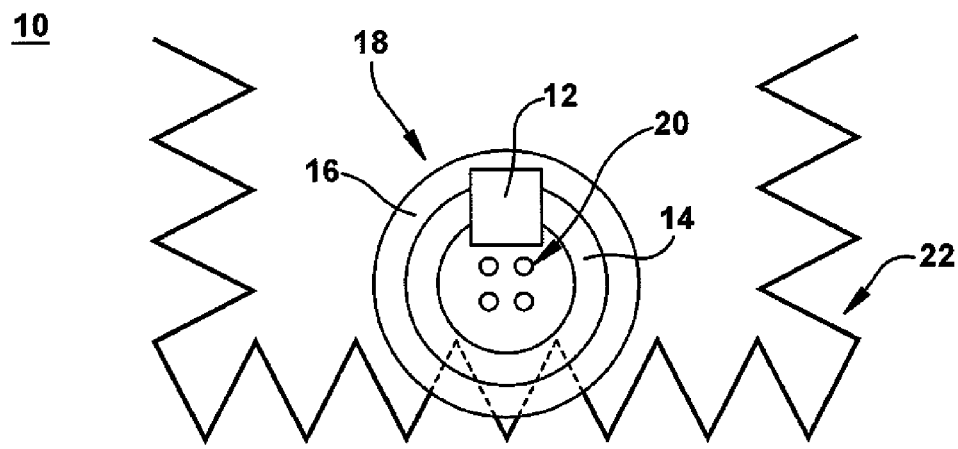
FIG. 1 is a diagrammatic illustration showing an exemplary RFID device in accordance with aspects of the present inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

In general, there is disclosed herein a washable or otherwise durable RFID device that can withstand repeated exposure to washing and/or other laundry processes, and therefore the RFID device is well suited to apparel tracking and/or inventorying. In one suitable embodiment, the aforementioned RFID device is a passive UHFID device employing an RFID IC or microchip that is operatively connected to a relatively small UHF inductive loop antenna. For example, the loop antenna optionally has a diameter of approximately 12 mm.

Suitably, the IC or microchip and the operatively connected loop antenna are encapsulated in a significantly durable and/or substantially rigid material or encapsulant, e.g., such as plastic. In practice, the encapsulant is optionally durable enough to protect the IC or microchip and operatively connected loop antenna from experiencing any significant damage or performance degradation as a result of repeated expose to washing and/or other laundry processes. Optionally, the IC or microchip and operatively connected loop antenna along with the encapsulant surrounding the same form an otherwise standard clothing button. For example, holes or the like are optionally drilled or otherwise formed in the encapsulant so that the combined structure (referred to herein nominal as the "button structure") may be readily sewn or otherwise affixed to a garment or other apparel item.

As can be appreciated, the button structure alone is generally not readable at relatively large distances with a conventional RFID reader. For example, the typical read range of the button structure described herein (i.e., a passive UHFID device including an RFID IC or microchip operatively connected to a UHF inductive loop antenna with an approximate 12 mm diameter, both encapsulated in plastic) is generally no more than about 15.24 cm. Therefore, in one suitable embodiment, the button structure is affixed or sewn to the garment or other apparel item near another larger radiating structure to "amplify" the RFID signal(s) exchanged with an associated RFID reader. That is to say, the read range of the overall RFID device (i.e., the button structure along with the radiating structure) is increased as a result of inductive coupling between the button structure's loop antenna and the radiating structure. For example, read ranges of approximately 6 meters or greater can be achieved.

In practice, the radiating structure can be made from any of a variety of electrically conductive materials and/or components having a wide variety of lengths, sizes, shapes, patterns, etc. In any event, the radiating structure is optionally sufficiently durable to withstand repeated washing and/or other laundry processes without experiencing significant damage and/or performance degradation. Optionally, the radiating structure is made from an electrically conductive thread (e.g., a standard type sewing thread coated and/or embedded with a metal or other conductive material), thin wire or the like that is sewn in a selected pattern directly within the garment or other apparel item near the location where the button structure is to be affixed or otherwise attached to the garment or apparel item. Alternately, the radiating structure can be similarly provisioned in or on a patch or label or the like which is in turn ironed-on or sewed or otherwise secured or attached at the proper location to the garment or apparel item that is receiving the RFID device. In either case, the radiating structure is optionally encapsulated in a suitable material to further enhance its protection from washing and/or other laundry processes. That is to say, the electrically conductive thread, wire or other like component is optionally coated or otherwise encased in a suitable protective layer and/or material.

With reference now to FIG. 1, there is shown an exemplary RFID device 10 in accordance with aspects of the present inventive subject matter. Optionally, the device 10 is a passive UHFID device. As shown, the device 10 includes an RFID IC or microchip 12 that is operatively connected to a relatively small UHF inductive loop antenna 14. For example, the loop antenna optionally has a diameter of approximately 12 mm. Suitably, the IC or microchip 12 includes selected electronics commonly found in any conventional RFID IC or microchip and/or operates in a manner similar to any conventional RFID IC or microchip. For example, the IC or microchip 12 optionally includes communications electronics, data memory, control logic, etc. In operation, the IC or microchip 12 optionally functions to store and/or process information (e.g., such as a unique identification code), modulate and/or demodulate RF signals, as well as optionally performing other conventional RFID functions. In general, the RFID device 10 suitably retains and communicates enough information to uniquely identify a garment, apparel item or other like object on which the device 10 is provided.

In one suitable embodiment, the IC or microchip 12 is bonded and electrically connected directly to the antenna 14 without any intermediate connecting leads. Alternately, an intermediate connection lead (not shown) is used instead of bonding the IC or microchip 12 directly to the antenna 14. For example, the intermediate leads can facilitate the process of operatively connecting the IC or microchip 12 to the antenna 14, which can be particularly difficult with smaller ICs or microchips. Thus, to interconnect the relatively small IC or microchip 12 to the antennas 14 in RFID device 10, intermediate structures variously referred to as "strap leads," "interposers," and "carriers" are sometimes used to facilitate the manufacture of the device 10. Suitably, the intermediate structures include conductive leads or pads that are electrically coupled to the contact pads of the IC or microchip 12 for coupling the IC or microchip 12 to the antenna 14. These leads provide a larger effective electrical contact area between the IC or microchip 12 and the antenna 14 than do the contact pads of the IC or microchip 12 alone. Additionally, with the use of the intermediate structures in the manufacturing process, the alignment between the antenna 14 and the IC or microchip 12 does not have to be as precise during the placement of the IC or microchip 12 on the antenna 14, e.g., as compared to when such strap leads are not used in the manufacturing process.

In the illustrated embodiment, the IC or microchip 12 and the operatively connected loop antenna 14 are encapsulated in an encapsulant 16 made from a significantly durable and/or substantially rigid material. For example, the encapsulant 16 is optionally made of a sufficiently durable and/or rigid plastic material. In practice, the encapsulant 16 is optionally durable enough to protect the IC or microchip 12 and operatively connected loop antenna 14 from experiencing any significant damage or performance degradation as a result of repeated expose to washing and/or other laundry processes. The combination of the IC or microchip 12 and operatively connected loop antenna 14 along with the encapsulant 16 surrounding the same are collectively referred to herein nominally as the "button structure" 18 since they optionally form what appears to be and/or function as an otherwise standard clothing button. As is shown in the illustrated embodiment, one or more holes 20 or the like are optionally drilled or otherwise formed in the encapsulant 16 so that the button structure 18 may be readily sewn or otherwise affixed to a garment or other apparel item (e.g., as better seen in FIG. 2).

Returning attention now to FIG. 1, the RFID device 10 also includes a radiating structure 22 that is in practice located sufficiently near and/or arranged with respect to the button structure 18 so as to inductively couple with the loop antenna 14 thereby substantially extending the effective distance (i.e., read range) at which the device 10 can be read by an associated RFID reader (not shown). Suitably, the radiating structure 22 is made from any of a variety of electrically conductive materials and/or components having a wide variety of lengths, sizes, shapes, patterns, etc. In any event, the radiating structure 22 is optionally sufficiently durable to withstand repeated washing and/or other laundry processes without experience significant damage and/or performance degradation. Optionally, the radiating structure 22 is made from an electrically conductive thread (e.g., a standard type sewing thread coated and/or embedded with a metal or other conductive material), thin wire or the like. In one suitable embodiment, the radiating structure 22 is sewn in a selected pattern directly in the garment or other apparel item near the location where the button structure 18 is to be affixed or otherwise attached to the garment or apparel item. In an alternate embodiment, the radiating structure 22 is similarly provisioned in or on a patch or label or the like which is in turn ironed-on or sewed or otherwise secured or attached at the proper location to the garment or apparel item that is receiving the RFID device 10. In either case, the radiating structure 22 is optionally encapsulated in a suitable material to further enhance its protection from washing and/or other laundry processes. For example, the electrically conductive thread, wire or other like component is optionally coated or otherwise encased in a suitable protective layer and/or material. Suitably, the radiating structure 22 increases the read range of the overall RFID device 10 (e.g., as compared to the button structure 18 alone) due to inductive coupling between the loop antenna 14 and the radiating structure 22. For example, read ranges up to approximately 6 m or greater are optionally achieved.

Figure 2:
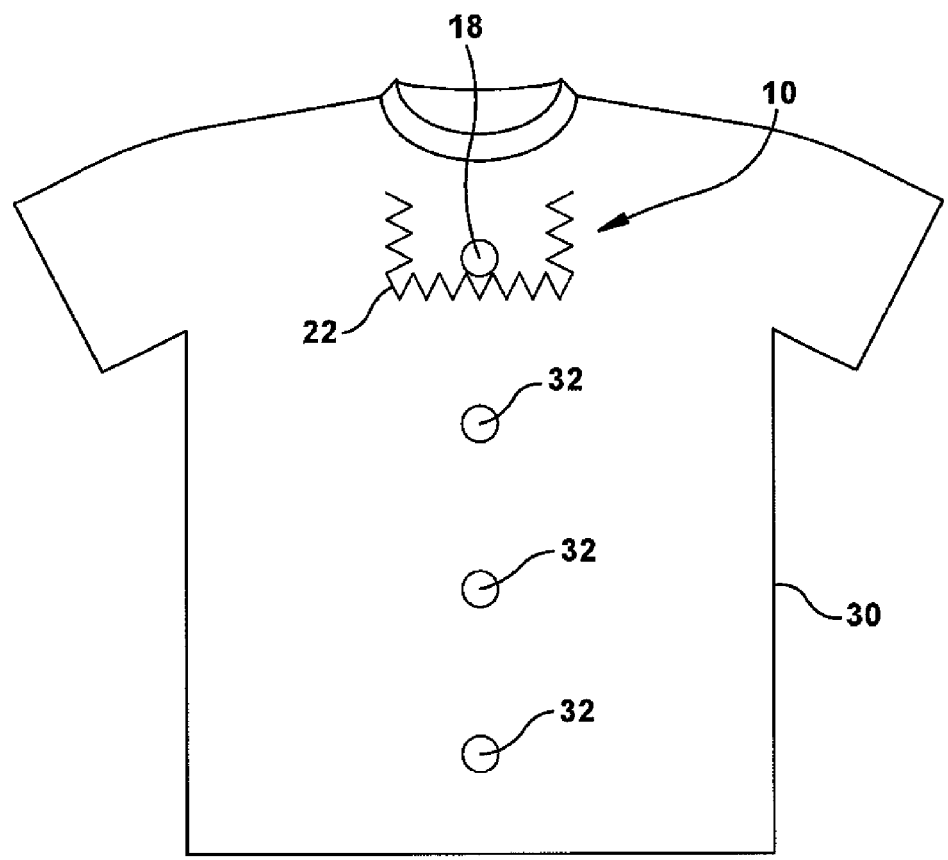
FIG. 2 is a diagrammatic illustration showing an exemplary implementation of the RFID device depicted in FIG. 1.

Turning attention now to FIG. 2, there is shown a garment or apparel item 30, e.g., such as a costume, uniform, etc., that is fitted or otherwise provisioned with an RFID device 10. In the illustrated embodiment, the button structure 18 and radiating structure 22 are sewn or otherwise affixed to the garment 30 in sufficient proximity and/or relative arrangement to one another so as to achieve the desired inductive coupling between the loop antenna 14 and the radiating structure 22. While highlighted for purposes of illustration in FIG. 2, suitably, the RFID device 10 is relatively inconspicuous by casual observation of the garment or apparel item 30. That is to say, for example, the button structure 18 optionally has an appearance significantly similar to any other button 32 on the garment 30 and/or the radiating structure 22 is optionally selected to blend into or otherwise significantly match the threads and/or material from which the garment 30 is made.

For simplicity and/or clarity herein FIG. 2 illustrates only one apparel item 30 provisioned with an RFID device 10. However, it is to be appreciated that in practice an enterprise desiring to track and/or inventory its collection or stock of garments (e.g., an amusement park tracking its costumes or another facility tracking its uniforms) will generally deploy a plurality of RFID devices (such as the device 10) affixed to a plurality of apparel items (such as the garment 30). As can be appreciated, each RFID device 10 is suitably programmed or otherwise provisioned with a unique identification code that is communicated to an RFID reader when the device 10 is queried, read or otherwise. Accordingly, each garment or apparel item 30 can be tracked and/or inventoried by the associated identification code obtained from the attached RFID device 10.

Figure 3A:
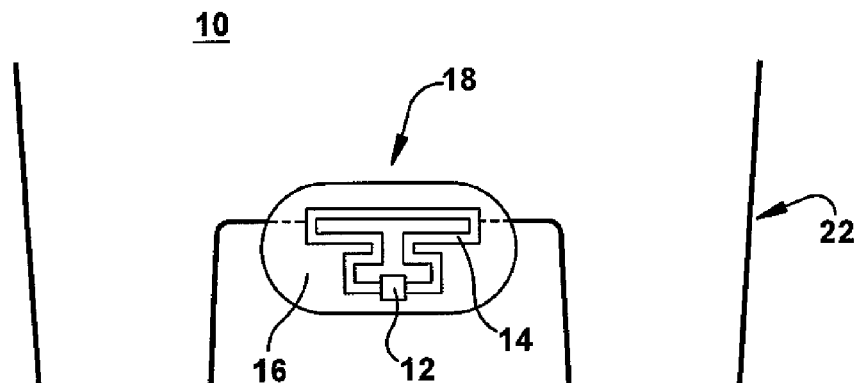
FIGS. 3A and 3B are diagrammatic illustrations showing alternate arrangements and/or embodiments of the RFID device depicted in FIG. 1.
Figure 3B:
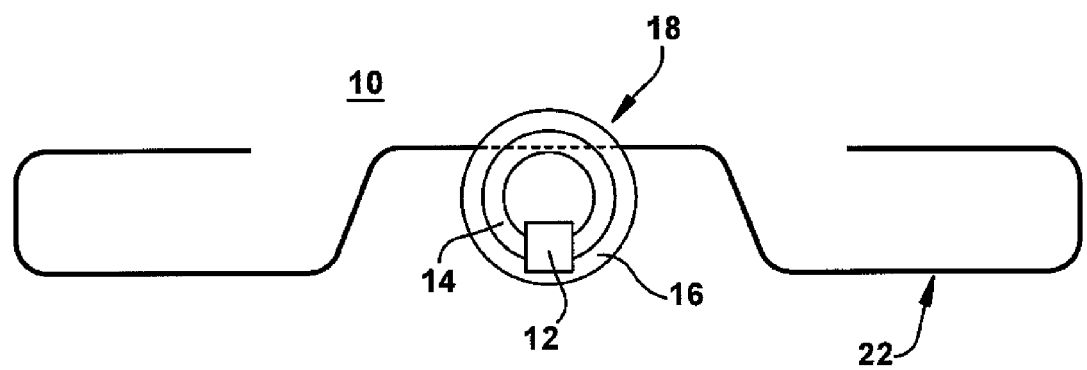

With reference now to FIGS. 3A and 3B, there are shown alternate arrangements and/or embodiments of the RFID device 10. In particular, it is to be noted that the radiating structure 22 (e.g., as shown in FIGS. 3A and 3B) can optionally take a variety of different forms, shapes, patterns, lengths, etc. Additionally, the loop antenna 14 is not limited to being simply circular. Rather, the loop antenna 14 may also take a variety of different forms, shapes, patterns, lengths, etc. For example, as shown in FIG. 3A, the loop antenna 14 optionally takes on a somewhat rectangular shape.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A radio frequency identification (RFID) device, said RFID device comprising:
   a circuit provisioned to communicate an identification code to an RFID reader;
   a first antenna operatively connected to the circuit;
   a radiating structure inductively coupled to the first antenna; and
   an encapsulant that encapsulates the circuit and the first antenna;
   wherein the encapsulant is provisioned with at least one hole formed therein;
   wherein the circuit, first antenna and encapsulate collectively form a structure that is sewn onto an apparel item, using the at least one hole; and
   wherein the radiating structure is integrated with the apparel item such that, when sewn into the apparel item, the radiating structure is inductively coupled to the first antenna.

2. The RFID device of claim 1, wherein said first antenna is a loop antenna.

3. The RFID device of claim 1, wherein the structure is a button.

4. The RFID device of claim 1 wherein the radiating structure is a conductive thread or a wire.

5. The RFID device of claim 4, wherein the circuit is implemented as an integrated circuit (IC).

6. The RFID device of claim 1, wherein the encapsulant is a plastic material.

7. The RFID device of claim 1, wherein the RFID device has a read range of 6 m or greater.

8. The RFID device of claim 1, wherein the RFID device does not experience any significant damage or performance degradation when exposed to washing or other laundry processes.

9. The RFID device of claim 1, wherein the radiating structure is optionally encapsulated in a suitable material to further enhance its protection from washing and/or other laundry processes.

10. A radio frequency identification (RFID) device for use with apparel, comprising;
    an encapsulated RFID device having an antenna and an integrated circuit coupled to the antenna, the encapsulated device being affixed to an item of apparel;
    a pattern of conductive material integrally sewn into the item of apparel and positioned adjacent the encapsulated RFID device; and
    wherein the pattern of conductive material provides a radiating antenna structure for the encapsulated RFID device.

11. The RFID device for use with apparel of claim 10, wherein the encapsulated device is a button.

* * * * *